Patented Nov. 5, 1940

2,220,701

UNITED STATES PATENT OFFICE 2,220,701

ABRASION RESISTANT FURNACE LINING

Raymond C. Benner and George J. Easter, Niagara Falls, N. Y., assignors to The Carborundum Company, Niagara Falls, N. Y., a corporation of Delaware No Drawing. Application March 20, 1937, Serial No. 132,087

6 Claims. (Cl. 266—43)

This application, which constitutes a continuation in part of our copending application Serial No. 721,065, filed April 17, 1934, relates to furnace linings and materials used in their construction; and particularly to the linings of rotary furnaces which are subject to both chemical erosion and abrasion by hard particles at high temperatures. Outstanding examples of such furnaces are cement kilns, rotary lime kilns, and various calciners.

In the lining of high temperature furnaces, such as rotary cement and lime kilns, it has hitherto been found that erosion of a bare refractory lining is relatively rapid due to a combination of chemical action and mechanical abrasion by the charge passing through the furnace. Efforts have been made to counteract this effect by using a lining which would not react chemically with the charge. In this way it has become customary to use high alumina firebrick for the lining of such furnaces. This has not however been entirely satisfactory for two reasons: one is that the ordinary bonded high alumina material continues to shrink when subjected to high temperatures, with the result that very objectionable cracks develop in the lining, and eventually pieces of the lining drop out.

Attempts have been made to get away from this shrinkage by calcining and even fusing the alumina before bonding it to form blocks or ramming cements. The calcining or fusing of the material has overcome the shrinkage, but the second objection remains, i. e., that the bond between fused particles of the material breaks away and the lining fails mechanically just as in the case of the unfused refractory, causing the face of the furnace lining to wear back comparatively rapidly. A modification of this type of lining in which relatively large lumps of prefused alumina have been set in a matrix of refractory cement has similarly proved unsuccessful.

In order to combat the difficulties described above it has become customary to line cement kilns, etc. with a rather open, soft bauxite brick having material porosity. The initial portions of the charge of cement then penetrate these pores and form an anchorage for the subsequent part of the charge which adheres to the penetrative portions. The final result is a self-lined kiln in which the walls are coated with a sintered semi-soft layer of the cement or other material being treated, over which layer the main body of the charge passes. Such linings are seriously damaged if the kiln is allowed to cool off, and are at best none too satisfactory for use with lime or with the higher melting calcium aluminate cements which do not start to sinter until temperatures sufficient to cause shrinkage of the lining are approached. The maximum temperature of operation of kilns having such linings is closely limited as, if the charge becomes too fluid, the lining is quickly worn back to the original brick which then erodes or shrinks and falls out as before. This type of lining and the necessarily resultant method of operating the kiln have however been the most efficient heretofore found and have come into wide use despite obvious deficiencies.

A further experiment has been tried in which such kilns have been lined with blocks of cast mullite. This material is composed of aluminum silicate containing from 60 to 80% alumina. It however proved too impermeable to permit operation of the kilns in the customary manner and was unsatisfactory when operated at higher temperatures on account of the rapidity of erosion of the surface of the refractory by the chemical and abrasive action of the charge. Spalling difficulties were also encountered.

We have found it possible to largely overcome these various difficulties by lining such furnaces with extremely hard, highly refractory solid cast masses consisting essentially of crystalline alumina with only minor percentages of impurities. The solid masses are not subject to the breaking out of particles by disruption of the bond between them as a result of the abrasive impact of the charge; and hence far outlast linings made of the same materials in the form of bonded granules. They are, moreover, so refractory, inert and hard even at furnace temperatures as to almost completely resist wear and erosion by hot lime or Portland cement. Their spall resistance, particularly if about 5% of magnesia is also present, far exceeds that of other cast refractories. Such cast alumina refractories do not soften below 1850 to 2000° C. and may be used to within 150°—200° C. of those temperatures without premature failure. They have the further advantage that the material being processed does not penetrate them thus forming a layer of material having a different coefficient of expansion which is almost certain to break the refractory on cooling. Kilns lined with cast alumina blocks may therefore be shut down and restarted successfully, although very slow change in furnace temperature is desirable if this is to be done successfully.

Either the alpha variety or the beta variety of cast alumina is suited for refractory linings of this type. A cast lining of beta alumina is particularly useful where the furnace lining is subject to alkali vapors. It is also somewhat more resistant to temperature changes than the alpha variety. It may be desirable, on account of cost, to use castings composed of slightly impure alumina containing minor percentages (perhaps 5%) of magnesia, lime or soda. A small percentage of titania or silica may also be present without detrimentally affecting the usefulness of the refractory material. It is in general desirable that the casting be composed of at least 90% $Al_2O_3$, although so long as the crystal phase is chiefly alumina the performance is fairly satisfactory even somewhat beyond that point.

Alumina for the production of castings for our purpose may be fused in an electric furnace such as the submerged arc furnace described and shown in United States Patent No. 929,517 to F. J. Tone; and the operation of the furnace may be similar to that followed in the production of synthetic alumina abrasives.

In general, the furnace will consist of a water cooled iron shell having no other lining than that built up by the material being fused as it is fed into the furnace. Fusion is effected initially by the heat from the carbon train between two or more carbon or graphite electrodes inserted in the iron shell, but after a bath of molten material is formed, the resistance of this material to the passage of electric current therethrough is used to supply heat. The material is gradually fed in and the electrodes raised as the fused mass is built up.

When the material has arrived at the proper temperature and the correct degree of fluidity, the casting is made by pouring the molten material into molds of the desired shape and size. The furnace may be adapted either for tapping the molten material out through its side or for tilting so as to pour over a lip. The molds may be of granular refractory material bonded with a core binder such as is commonly used in foundry practice, or may be made of slabs of preburned refractory, or of a suitable metal, or of carbon. The molded articles should be of the proper shape to form a section of the furnace lining, and the size should be as large as is convenient for a bricklayer to handle in lining the furnace.

If desired, the molds may be preheated and are insulated to prevent too rapid loss of heat by embedding them in a molding flask in which they are surrounded by sand or other heat insulating material. The molds should be provided with risers of ample size to permit complete filling of the mold without interference by material freezing in the headers. Moreover, the headers should be of sufficient size to allow for the contraction of the molten material as it solidifies in the mold. If the riser is made wedge-shaped with its minimum section immediately adjoining the mold, removal of the excess material constituting a header is facilitated. After a mold is filled it is moved away and additional molds filled successively.

The molded sections are left in the mold for heat treatment or, particularly in the case of iron molds, are taken from the molds shortly after the outer walls of the casting have solidified. Thereafter they are carefully cooled by any of the methods well-known in the art; and after they are cool any objectionable remainder of the header or other minor roughness is removed by chipping or grinding.

This method of casting forms no part of the present invention and is recited only to clearly distinguish from the process known as "slip-casting" which is sometimes used in the fabrication of bonded alumina refractories. When we herein speak of cast blocks or castings it is to be understood that they are not slip-cast but cast from a molten mass.

The blocks, after being cast and dressed, are laid in the form of a lining for the kiln, calciner or other furnace, using little or no cementing material to hold them in place, and are thereafter ready for immediate service without further firing, although due to the close dense structure of such refractories it is desirable that the temperature of the furnace be brought up relatively slowly in order to avoid spalling.

While it is entirely feasible and from a service standpoint is desirable to make the entire lining of the furnace of cast alumina blocks, these are relatively costly so that it is within the scope of our invention to use them for lining only the hot zone or other portion where their use is particularly indicated by the greater severity of the service encountered. Similarly, the upper end of the kiln may be lined with beta castings to withstand alkaline vapors and the heat shock caused by contact of the cold charge with the hot lining, while a lower part is lined with the denser alpha corundum castings, which are mechanically stronger and very resistant to the semi-molten charge.

We claim:

1. In a lining for a rotary lime or Portland cement kiln, a zone formed of dense, hard castings composed essentially of crystalline alumina.

2. A rotary lime or Portland cement kiln lining comprising dense refractory castings laid with substantially no cementing material between them, said casting being composed of at least 90% alumina.

3. A lining for a rotary lime or Portland cement kiln, comprising a zone consisting of dense non-metallic refractory castings, which castings are composed of at least 90% alumina.

4. A lining for a rotary kiln comprising a zone composed of beta alumina castings and another zone composed of alpha alumina castings.

5. A lime or Portland cement kiln lining composed of dense refractory castings consisting essentially of crystalline alumina.

6. A lining for a rotary lime or cement kiln consisting of dense refractory castings composed of at least 90% alumina and comprising a minor percentage of an alkaline oxide.

RAYMOND C. BENNER.
GEORGE J. EASTER.